United States Patent
Raja K

(12) 
(10) Patent No.: US 9,809,134 B2
(45) Date of Patent: Nov. 7, 2017

(54) AUTOMATICALLY ALIGNING LATCHING ARRANGEMENT

(71) Applicant: Mahendra Raja K, Trichur (IN)

(72) Inventor: Mahendra Raja K, Trichur (IN)

(73) Assignee: FCA US LLC, Auburn Hills, MI (US)

( * ) Notice: Subject to any disclaimer, the term of this patent is extended or adjusted under 35 U.S.C. 154(b) by 21 days.

(21) Appl. No.: 14/978,418

(22) Filed: Dec. 22, 2015

(65) Prior Publication Data

US 2017/0174104 A1  Jun. 22, 2017

(51) Int. Cl.
*B60N 2/44* (2006.01)
*B60N 2/14* (2006.01)
*B60N 2/10* (2006.01)

(52) U.S. Cl.
CPC ............... *B60N 2/442* (2013.01); *B60N 2/10* (2013.01); *B60N 2/14* (2013.01); *B60N 2/146* (2013.01); *B60N 2002/4455* (2013.01)

(58) Field of Classification Search
USPC ................................ 296/65.01, 65.03, 65.05
See application file for complete search history.

(56) References Cited

U.S. PATENT DOCUMENTS

| | | | |
|---|---|---|---|
| 4,305,611 A | 12/1981 | Robins | |
| 7,296,840 B2 * | 11/2007 | Martone | B60N 2/01583 248/503.1 |
| 8,763,979 B2 * | 7/2014 | Blake | B60N 2/01583 248/503.1 |
| 8,851,548 B2 * | 10/2014 | Pacolt | B60N 2/01583 296/65.03 |
| 2005/0173939 A1 * | 8/2005 | Bonk | B60N 2/01583 296/65.05 |
| 2012/0067895 A1 | 3/2012 | Williams | |

* cited by examiner

*Primary Examiner* — Jason S Daniels
(74) *Attorney, Agent, or Firm* — Ralph E. Smith

(57) ABSTRACT

A seat assembly includes a striker pin that is mounted to either a vehicle floor or a seat bottom. A latch assembly is mounted to the other of the vehicle floor and the seat bottom, and is configured to engage the striker pin. A pivot bracket assembly includes a first bracket member that is attached to the seat bottom and pivotally attached to a second bracket member which is fixedly mounted to the vehicle floor. One or both of the first bracket of the pivot bracket assembly and the latch plate of the latch assembly is movable relative to the vehicle floor and the seat bottom to facilitate alignment of the opening in the latch plate with the striker pin.

13 Claims, 9 Drawing Sheets

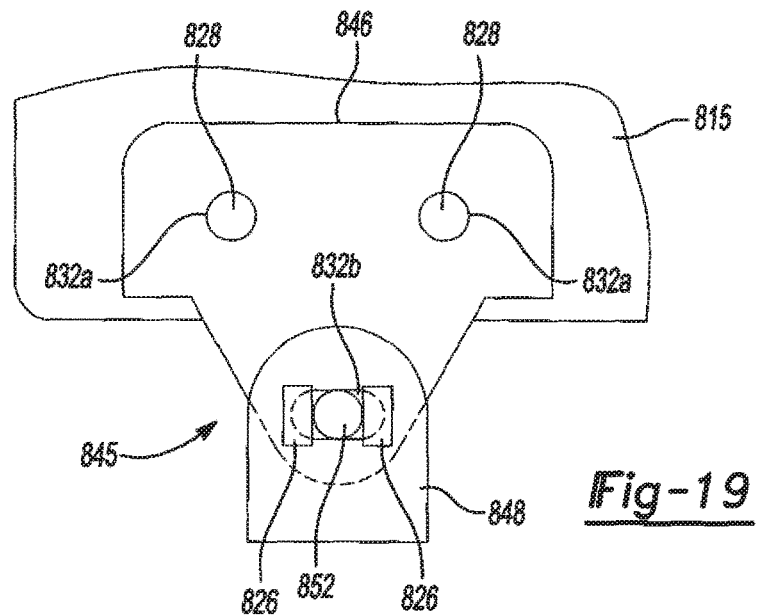
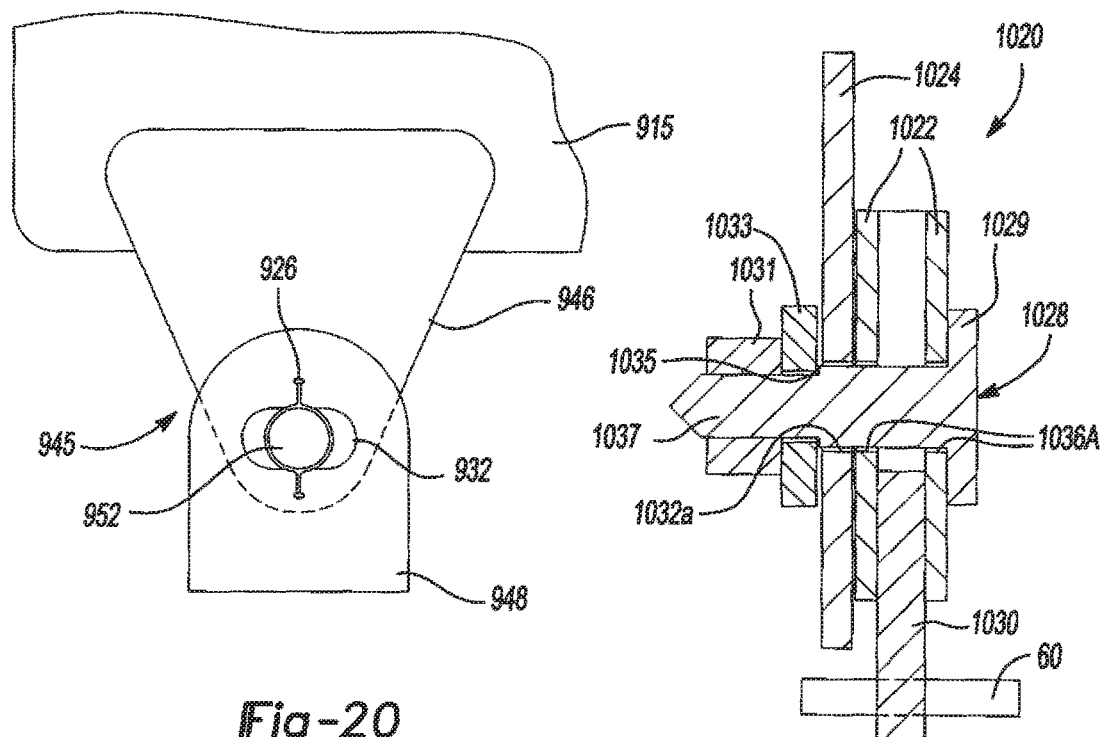
Fig-19
Fig-20
Fig-21

AUTOMATICALLY ALIGNING LATCHING ARRANGEMENT

FIELD

The present disclosure relates to a vehicle seat assembly having an automatically aligning latch arrangement.

BACKGROUND

A conventional vehicle seat assembly may include a seat base which is mounted to a vehicle floor by a pivotable connection at the front end of the seat base. A latch assembly may be mounted to a rear end of the seat base and can be removably connected to a striker pin mounted on the vehicle floor. Manufacturing variations in the construction of the seat assembly and of the location of the striker pin on the vehicle floor can cause misalignment between the latch assembly and the striker pin. The teachings of the present disclosure provide assemblies and methods for accommodating such misalignment and securely engaging the latch assembly with the striker pin.

SUMMARY

In one form, the present disclosure provides a seat assembly that may include a seat bottom, a seatback, a striker pin, a latch assembly and a pivot bracket assembly. The seatback is attached to the seat bottom. The striker pin is fixed to either a vehicle floor or the seat bottom. The latch assembly is mounted to the other of the vehicle floor and the seat bottom. The latch assembly may include a latch plate having an opening and a movable locking tab configured to retain the striker pin within the opening. The pivot bracket assembly includes a first bracket member attached to the seat bottom and a second bracket member fixedly mounted to the vehicle floor. The first bracket member is pivotably attached to the second bracket member. One or both of the first bracket of the pivot bracket assembly and the latch plate of the latch assembly is movable relative to the vehicle floor and the seat bottom to align the opening in the latch plate relative to the striker pin.

In some configurations, the pivot bracket assembly may be mounted at or near a front end of the seat bottom, and the latch assembly may be mounted at or near a rear end of the seat bottom (i.e., the pivot bracket assembly may be closer to a front end of the vehicle than the latch assembly).

In some configurations, the latch plate is movable relative to the vehicle floor and the seat bottom.

In some configurations, the latch assembly includes a bracket plate having a plurality of elongated slots and the latch plate having a plurality of apertures extending therethrough, the elongated slots having longitudinal axes perpendicular to the striker pin.

In some configurations, the latch plate opening has two angled surfaces facing each other and configured to extend to a U-shaped opening.

In some configurations, the latch assembly includes a plurality of fasteners connecting one elongated slot in the bracket plate to one aperture in the latch plate and another fastener connecting another elongated slot in the bracket plate to another aperture in the latch plate.

In some configurations, the latch assembly includes a fastener connecting one of the apertures in the latch plate to an aperture in the locking tab.

In some configurations, the elongated slots in the bracket plate allow the latch plate to move and compensate misalignment with the striker pin.

In some configurations, a plurality of spring members are mounted to the bracket plate to keep the fasteners and the latch plate at a nominal position once the latch plate receives the striker pin.

In some configurations, the first bracket member of the pivot bracket assembly is movable relative to the vehicle floor and the seat bottom.

In some configurations, the first bracket member of the pivot bracket assembly has one or more elongated slots to allow the first bracket member to move and compensate the latch plate misalignment with the striker pin.

In some configurations, one pivot pin connects one elongated slot in the first bracket member to an aperture in the second bracket member.

In some configurations, a plurality of spring members are mounted to the first bracket member of the pivot bracket assembly to retain the pivot pin at a nominal position once the latch plate receives the striker pin.

In some configurations, the first bracket member has a plurality of curved elongated slots.

In some configurations, the seat bottom has a plurality of apertures having a centerline axis parallel to the centerline axis of the striker pin.

In some configurations, a plurality of pins connect one curved elongated slot in the first bracket member to one aperture in the seat bottom and another pin connects another curved elongated slot in the first bracket member to another aperture in the seat bottom.

In some configurations, a plurality of spring members are mounted to the first bracket member of the pivot bracket assembly to retain the pins and the first bracket member at a nominal position.

Further areas of applicability will become apparent from the description provided herein. The description and specific examples in this summary are intended for purposes of illustration only and are not intended to limit the scope of the present disclosure.

DRAWINGS

FIG. 19 is a front view of another alternative pivot bracket that can be incorporated into the vehicle seat assembly;

FIG. 20 is a front view of yet another alternative pivot bracket that can be incorporated into the vehicle seat assembly; and FIG. 21 is a cross-sectional view of another alternative latch assembly engaged with a striker pin.

Corresponding reference numerals indicate corresponding parts throughout the several views of the drawings.

DETAILED DESCRIPTION

Example embodiments will now be described more fully with reference to the accompanying drawings.

Figure 1:
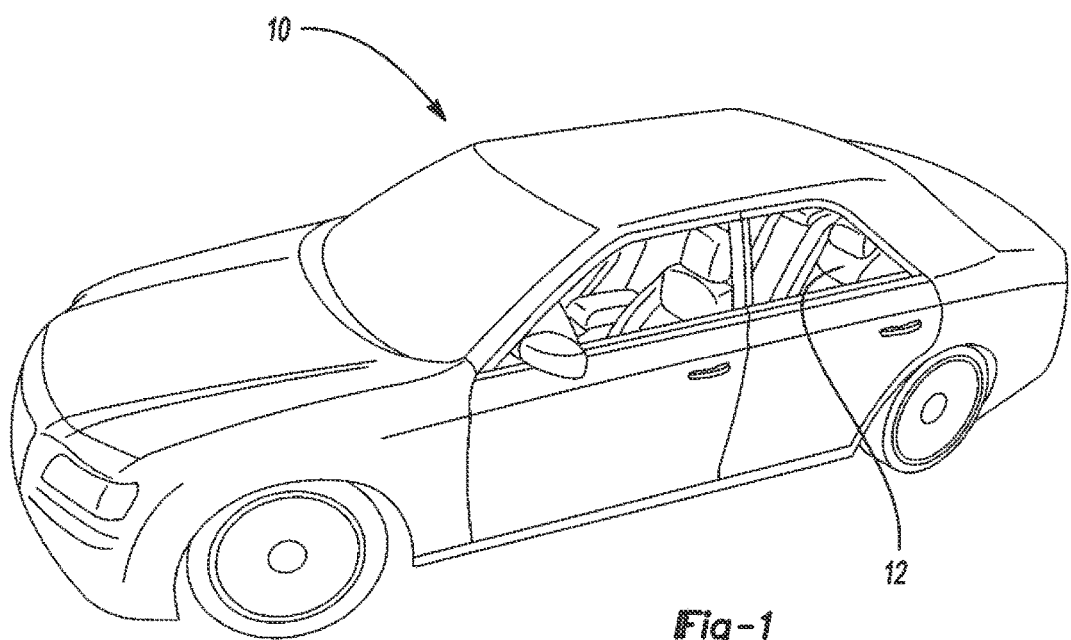
FIG. 1 is a perspective view of a vehicle having a vehicle seat assembly according to the principles of the present disclosure.
Figure 2:
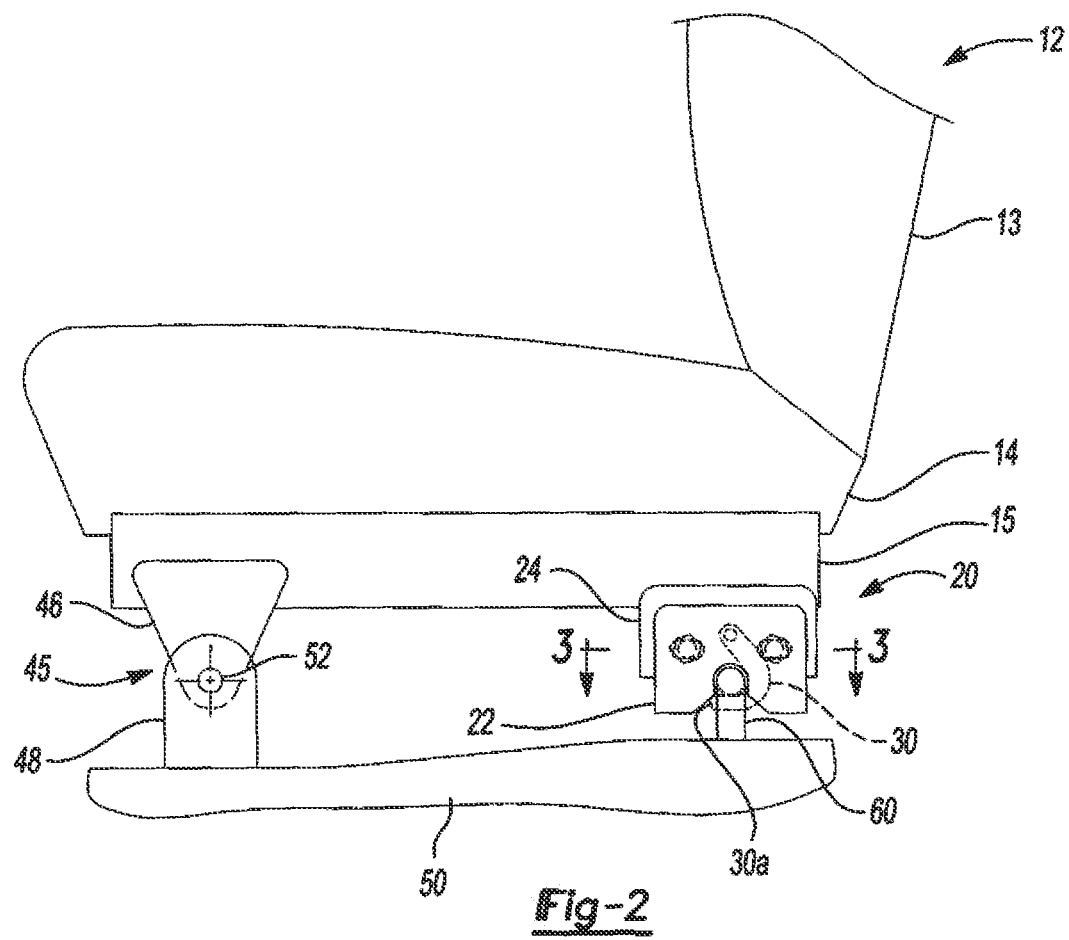
FIG. 2 is a side view of a portion of the vehicle seat assembly with a pivot bracket assembly and latch assembly attached to a floor of the vehicle.

FIG. 1 depicts a vehicle 10 with a plurality of vehicle seat assemblies 12 positioned therein. As shown in FIG. 2, each vehicle seat assembly 12 may include a seatback 13 attached to a seat bottom 14. The seat bottom 14 may be attached to a vehicle floor 50 of the vehicle 10 by a pair of pivot bracket assemblies 45 (one of which is shown in the figures) and a pair of self-adjusting latch assemblies 20 (only one of which is shown in the figures). The latch assemblies 20 can removably engage corresponding U-shaped striker pins 60 (only one of which is shown in the figures) that are fixedly mounted to the vehicle floor 50. As will be described in more detail below, the latch assemblies 20 are adjustable to accommodate misalignment between the latch assemblies 20 and the striker pins 60.

As shown in FIG. 2, each pivot bracket assembly 45 may include first and second bracket members 46, 48. The first bracket member 46 may be fixedly attached to a side rail 15 of the seat bottom 14. The second bracket member 48 may be fixedly attached to the vehicle floor 50. A pivot pin 52 may extend through the first and second bracket members 46, 48 to allow relative rotation between the first and second bracket members 46, 48 and relative rotation between the vehicle seat assembly 12 and the vehicle floor 50.

Figure 3:
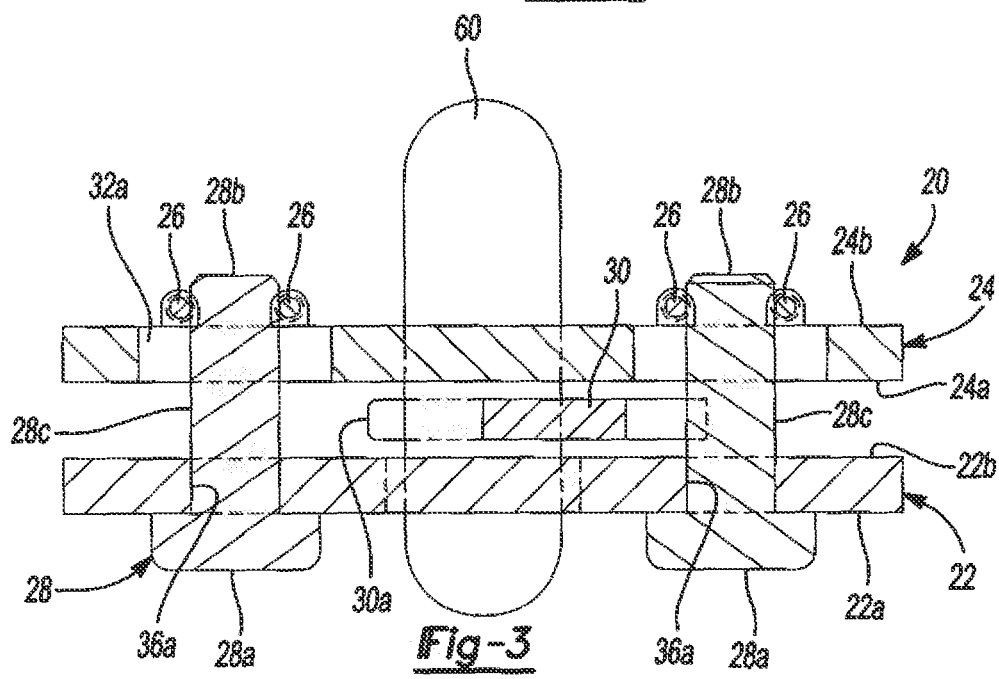
FIG. 3 is a cross-sectional view of the latch assembly taken along line 3-3 of FIG. 2.
Figure 4:
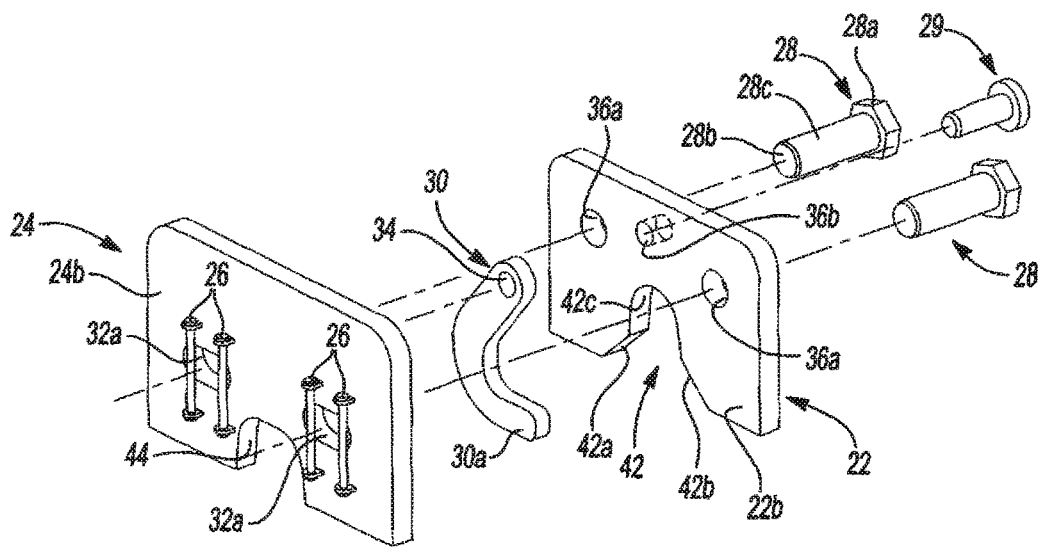
FIG. 4 is an exploded view of the striker pin and latch assembly shown in FIG. 3.
Figure 4:
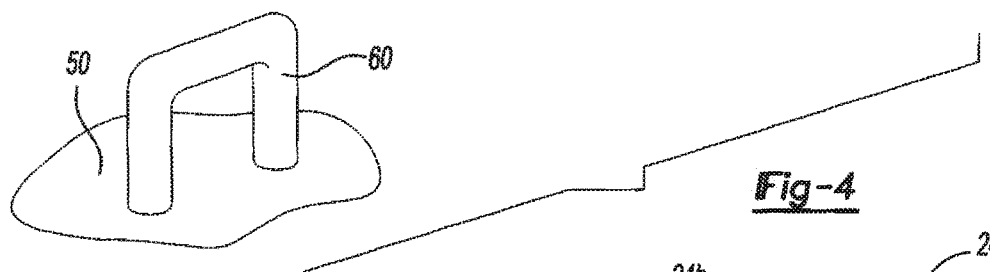
Figure 5:
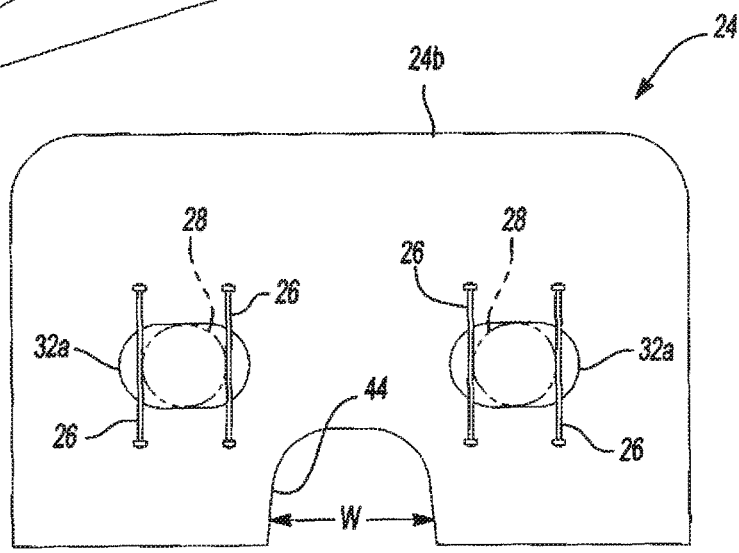
FIG. 5 is a back view of a bracket of the latch assembly.
Figure 6:
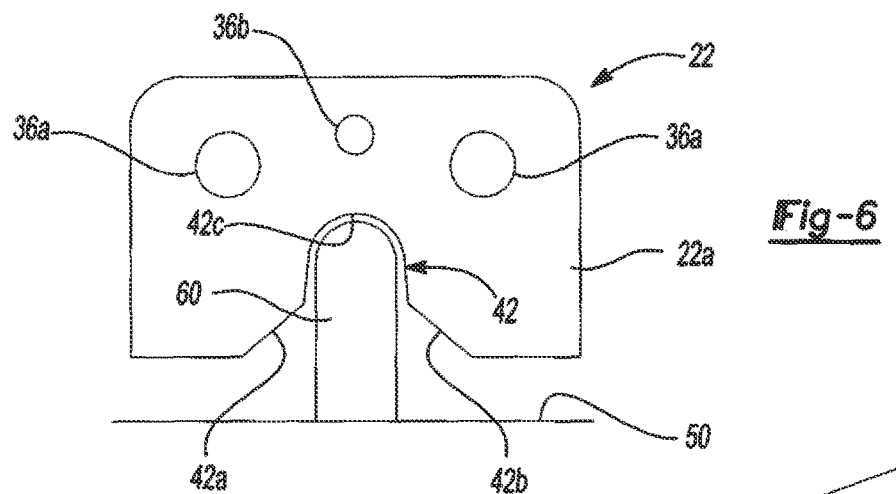
FIG. 6 is a front view of a striker pin received in a latch plate of the latch assembly.
Figure 7:
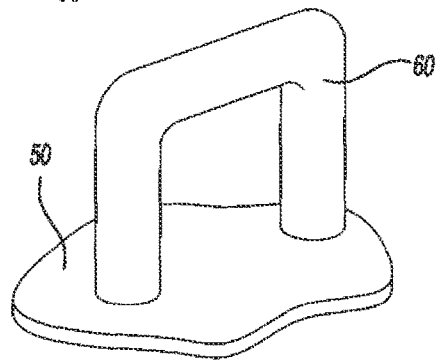
FIG. 7 is a perspective view of the striker pin.

As shown in FIG. 2, the latch assembly 20 may removably engage the striker pin 60 to rotationally fix the vehicle seat assembly 12 relative to the vehicle floor 50. As shown in FIGS. 2-9, each latch assembly 20 may include a latch plate 22, a bracket plate 24, and a locking tab 30. As shown in FIGS. 4 and 6, the latch plate 22 may include a plurality of mounting apertures 36a, a pivot aperture 36b, and a slot or opening 42. The opening 42 may include a generally U-shaped portion 42c, and a pair of angled surfaces 42a, 42b. The angled surfaces 42a, 42b may generally face each other and may be angled relative to each other, thereby widening the opening 42 beyond the width of the U-shaped portion 42c.

As shown in FIG. 2, the bracket plate 24 may be fixedly mounted to the side rail 15 of the seat bottom 14. As shown in FIGS. 4 and 5, the bracket plate 24 may include a plurality of elongated slots 32a and a generally U-shaped slot or opening 44. The opening 44 may be disposed generally between and below the elongated slots 32a. The opening 44 may have a width W that is larger than a width of the U-shaped portion 42c of the opening 42 in the latch plate 22. The elongated slots 32a may be elongated in a direction parallel to the width W of the opening 44. That is, longitudinal axes of the elongated slots 32a may extend in a direction parallel to the width W (i.e., in a direction extending between the rear end and front end of the seat bottom 14). The bracket plate 24 may also include a plurality of resiliently stretchable spring members 26 having ends that are fixedly attached thereto. Two of the spring members 26 may extend across a width of one of the elongated slots 32a (i.e., perpendicular to the longitudinal axis of the elongated slot 32a), and another two of the spring members 26 may extend across a width of the other one of the elongated slots 32a.

The latch plate 22 may be movably mounted to the bracket plate 24 by a plurality of fasteners 28. Each fastener 28 may extend through a corresponding one of the mounting apertures 36a in the latch plate and a corresponding one of the elongated slots 32a in the bracket plate 24. As shown in FIG. 3, a shaft 28c of each fastener 28 may extend between adjacent spring members 26. A head 28a of each fastener 28 may abut a first side 22a (i.e., a side facing away from the bracket plate 24) of the latch plate 22. While not shown in the figures, a nut may be attached to an end 28b of each fastener 28 and may abut a second side 24b (i.e. a side facing away from the latch plate 22) of the bracket plate 24. As shown in FIGS. 3 and 5, the diameter of a shaft 28c of each fastener 28 is smaller than the length of each elongated slot 32a such that the fasteners 28 can translate within the elongated slots 32a along the longitudinal axes of the elongated slots 32a. The diameters of the shafts 28c may be generally equal to or only slightly smaller than the diameters of the mounting apertures 36a in the latch plate 22. In this manner, the latch plate 22 may translate with the fasteners 28 along the lengths of the elongated slots 32a relative to the bracket plate 24, the seat bottom 14 and the vehicle floor 50. The spring members 26 disposed on both sides of the shaft 28c of each fastener 28 may bias the fasteners 28 toward a nominal position (i.e., the middle of the elongated slots 32a).

Figure 8:
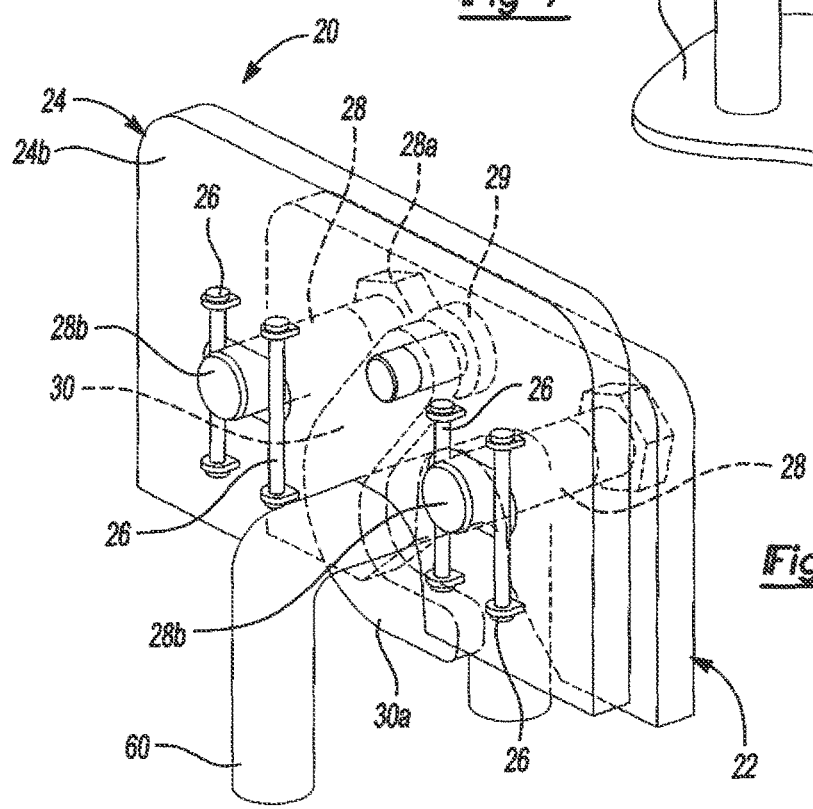
FIG. 8 is a perspective view of the latch assembly engaging the striker pin.
Figure 9:
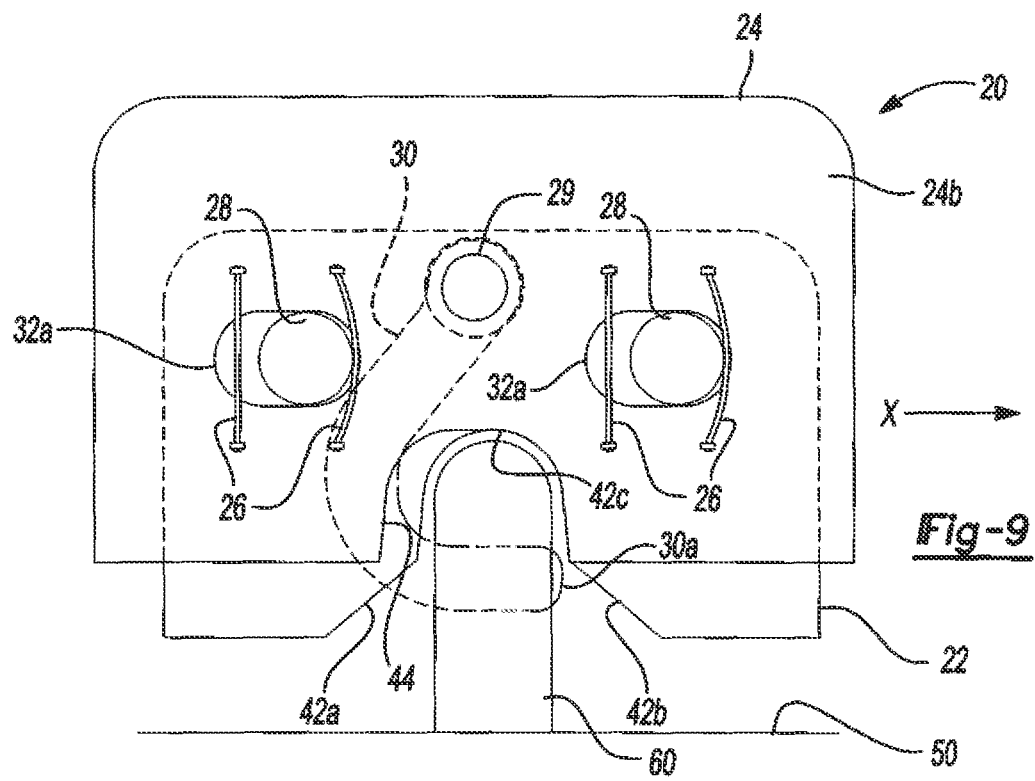
FIG. 9 is a back view of the latch assembly of FIG. 4 compensating for misalignment with the striker pin.

As shown in FIG. 3, the locking tab 30 may be disposed between the latch plate 22 and the bracket plate 24. As shown in FIG. 4, the locking tab 30 may be a generally hook-shaped member and may be pivotably mounted to the latch plate 22. That is, a pivot pin or rivet 29 may extend through the pivot aperture 36b of the latch plate 22 and may be received in an aperture 34 in the locking tab 30, thereby allowing the locking tab 30 to rotate relative to the latch plate 22 and the bracket plate 24. As shown in FIGS. 8 and 9, a free end 30a of the locking tab 30 may extend across the opening 42 in the latch plate 22 such that the striker pin 60 can be received in the opening 42 and locked therein by the free end 30a. The locking tab 30 may be selectively movable relative to the latch plate 22 and the bracket plate 24 to selectively allow the striker pin 60 to enter the U-shaped portion 42c of the opening 42.

With continued reference to FIGS. 1-9, installation and operation of the vehicle seat assembly 12 will be described in detail. When the vehicle seat assembly 12 is initially installed in the vehicle 10, the seat bottom 14 may be initially attached to the vehicle floor 50 by attaching the first bracket member 46 of each pivot bracket assembly 45 to the corresponding second bracket members 48, thereby rotatably attaching the vehicle seat assembly 12 to the vehicle floor 50, as described above. Thereafter, the rear end of the vehicle seat assembly 12 may be rotated downward toward the vehicle floor 50 so that the latch assemblies 20 can engage the striker pins 60 to rotatably fix the vehicle seat assembly 12 to the vehicle floor 50.

In the event that either of the striker pins 60 are misaligned relative to the U-shaped portion 42*c* of the opening 42 of the corresponding latch assembly 20, the position of the latch assembly 20 can automatically adjust relative to the seat bottom 14 and the vehicle floor 50 to accommodate such misalignment. That is, if the striker pin 60 contacts either of the angled surfaces 42*a*, 42*b* of the latch plate 22 as the seat bottom 14 is rotated downward toward the striker pin 60, the contact between the striker pin 60 against the angled surface 42*a* or 42*b* can cause the latch plate 22 and the fasteners 28 to translate along the lengths of the elongated slots 32*a* (e.g., in direction X or in the direction opposite direction X) until the U-shaped portion 42*c* of the opening 42 is aligned with the striker pin 60 to allow the striker pin 60 to be received therein, as shown in FIG. 9. As shown in FIG. 9, the spring members 26 may resiliently stretch or deform to allow such movement of the fasteners 28 within the elongated slots 32*a*. It will be appreciated that the opening 44 in the bracket plate 24 is sufficiently wide to receive the striker pin 60 regardless of the amount of adjustment of the latch plate 22 relative to the bracket plate 24.

In some configurations, the latch assembly 20 may include a cam pivotably mounted to the bracket plate 24, above the latch plate 22. The cam may be positioned on the bracket plate 24 so that the cam center line runs through the striker pin 60 center point when the striker pin 60 is received in the U shaped opening 42*c* of the latch plate 22 and one end of the cam engages the latch plate 22. The spring members 26 may be fixedly mounted to the bracket plate 24 at one end and fixedly mounted to the cam at the other. In this way, the spring members 26 and the cam bias the latch plate 22 toward a nominal position with respect to the bracket plate 24.

Figure 10:
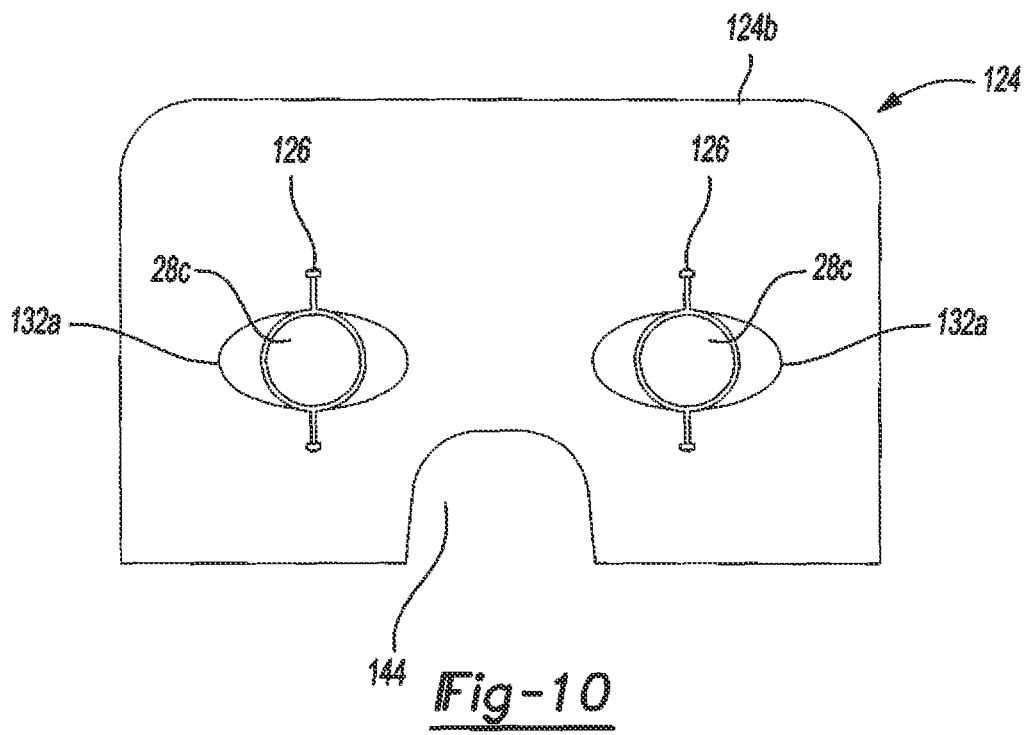
FIG. 10 is a back view of an alternative bracket that can be incorporated into the latch assembly.

With reference to FIG. 10, another bracket plate 124 is provided that can be incorporated into the latch assembly 20 instead of the bracket plate 24. The structure and function of the bracket plate 124 may be similar or identical to that of the bracket plate 24, apart from any exceptions described below.

As show in FIG. 10, the bracket plate 124 may include a plurality of elliptical shape slots 132*a*. Each elliptical shape slot 132*a* may consist of spring members 126 having ends fixedly attached to the bracket plate 124. The spring members 126 may further have a circular hoop portion positioned in the center of the elliptical shape slot 132*a* to receive shafts 128*c* of fasteners 128, thereby biasing the fasteners 128 toward a nominal position. In this way, the spring members 126 may translate with the fasteners 128 along the lengths of the elliptical slots 132*a* relative to the bracket plate 124. While the shape of the elliptical slots 132*a* differ from the shape of the elongated slots 32*a* mentioned above, the bracket plate 124 may have identical shape elongated slots 32*a* incorporated therein.

Figure 11:
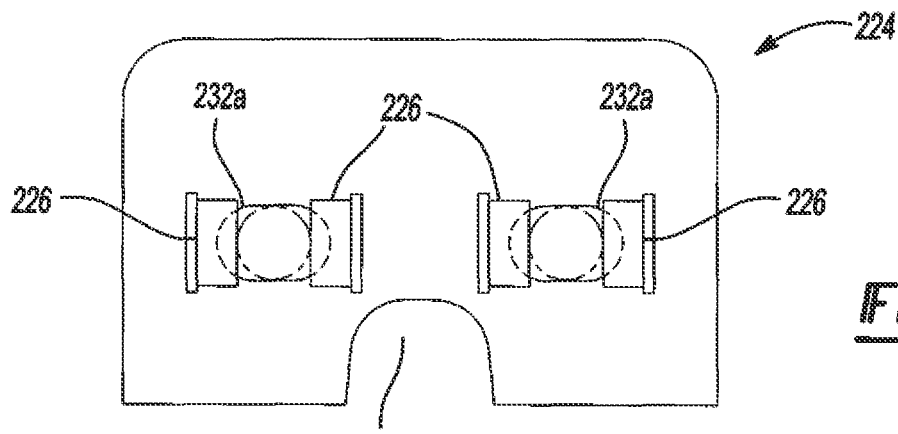
FIG. 11 is a back view of another alternative bracket that can be incorporated into the latch assembly.

With reference to FIG. 11, another bracket plate 224 is provided that can be incorporated into the latch assembly 20 instead of the bracket plate 24. The structure and function of the bracket plate 224 may be similar or identical to that of the bracket plate 24, apart from any exceptions described below.

As shown in FIG. 11, the bracket plate 224 may include a plurality of elongated slots 232*a* and a plurality of spring members 226. Each elongated slot 232*a* may have a pair of the spring members 226 mounted on both sides thereof. The spring members 226 may overlap the ends of the elongated slot 232*a*, so that the spring members 226 can bias shafts 228*c* of fasteners 228 toward nominal positions (e.g., center of the elongated slots 232*a*). In some configurations, the spring members 236 may be blocks formed from a resiliently compressible material (e.g., an elastomer).

Figure 12:
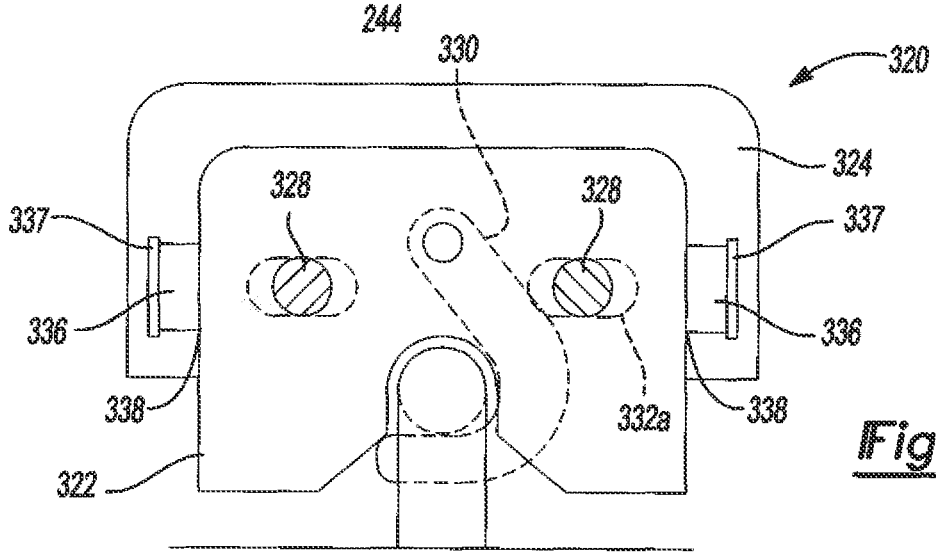
FIG. 12 is a front view of an alternative latch assembly engaged with a striker pin.

With reference to FIG. 12, another latch assembly 320 is provided that can be incorporated into the vehicle seat assembly 12 instead of the latch assembly 20. The structure and function of the latch assembly 320 may be similar or identical to that of the latch assembly 20, apart from any exceptions described below.

As shown in FIG. 12, the latch assembly 320 may include a bracket plate 324, a latch plate 322, a locking tab 330 and a plurality of spring members 336. A fixed end 337 of each spring member 336 is fixedly attached to the bracket plate 324, and a movable end 338 of each spring member 336 contacts the latch plate 332. The spring members 336 bias the latch plate 322 toward a nominal position whereby fasteners 328 are positioned in the center of the elongated slots 332*a*. In some configurations, the spring members 336 may be blocks formed from a resiliently compressible material (e.g., an elastomer).

Figure 13:
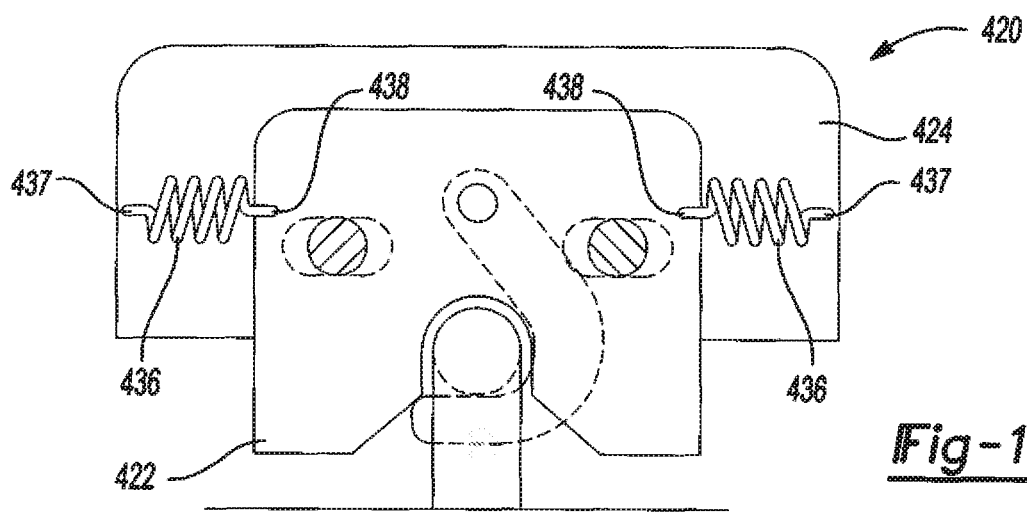
FIG. 13 is a front view of another alternative latch assembly engaged with a striker pin.

With reference to FIG. 13, another latch assembly 420 is provided that can be incorporated into the vehicle seat assembly 12 instead of the latch assembly 20. The structure and function of the latch assembly 420 may be similar or identical to that of the latch assembly 320, however, the latch assembly 420 may include helical spring members 436 having fixed and movable ends 437, 438 attached to bracket plate 424 and latch plate 432, respectively.

Figure 14:
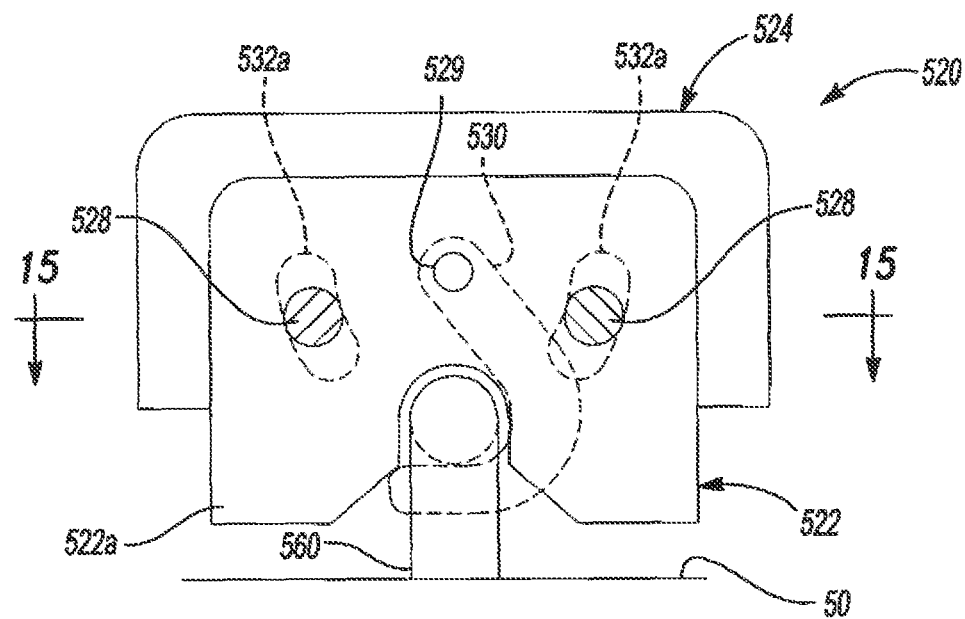
FIG. 14 is a front view of yet another alternative latch assembly engaged with a striker pin.
Figure 15:
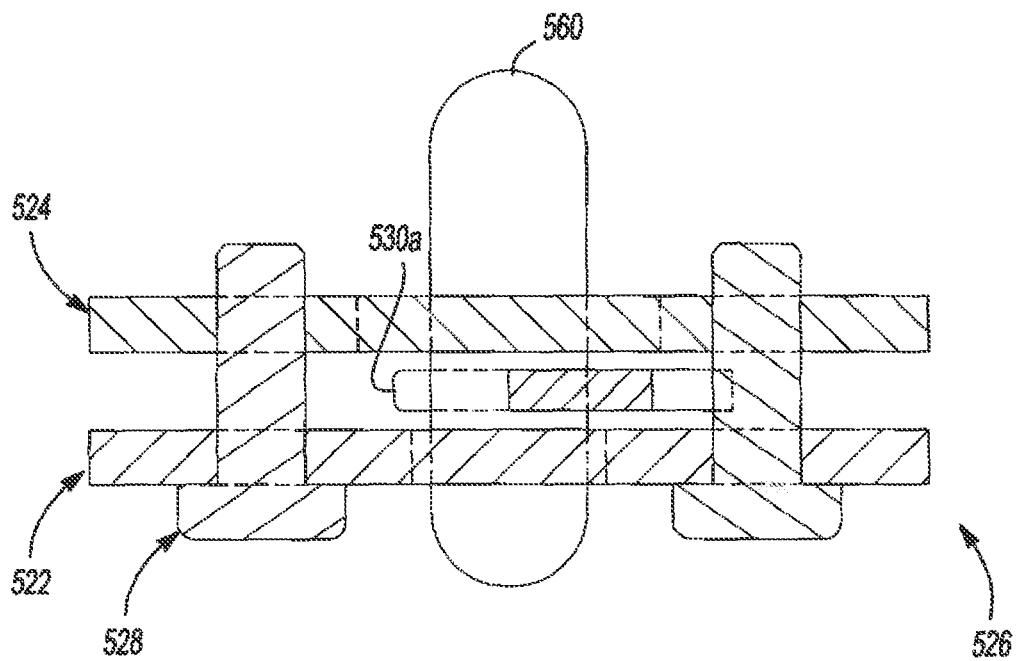
FIG. 15 is a cross-sectional view of the latch assembly taken along line 15-15 of FIG. 14.

With reference to FIGS. 14 and 15, another latch assembly 520 is provided that can be incorporated into the vehicle seat assembly 12 instead of the latch assembly 20. The structure and function of the latch assembly 520 may be similar or identical to that of the latch assembly 20, apart from any exceptions described below.

As shown in FIG. 14, the latch assembly 520 may include a bracket plate 524, a latch plate 522, and a locking tab 530. The bracket plate 524 may have a plurality of elongated slots 532*a* that movably receive fasteners 528. The elongated slots 532*a* may be curved such that the elongated slots 532*a* curve toward each other as they extend downward toward a striker pin 560. In this way, the bracket plate 524 elongated slots 532*a* allow the latch plate 522 to move and compensate misalignment with the striker pin 560. A pivot pin or rivet 529 may extend through a latch plate pivot aperture 536*b* providing for additional pivoting of the latch plate 522. While not shown in FIGS. 14 and 15, spring members can be mounted on the bracket plate 524 and/or the latch plate 522, to bias the latch plate 522 toward a nominal position with respect to the bracket plate 524.

Figure 16:
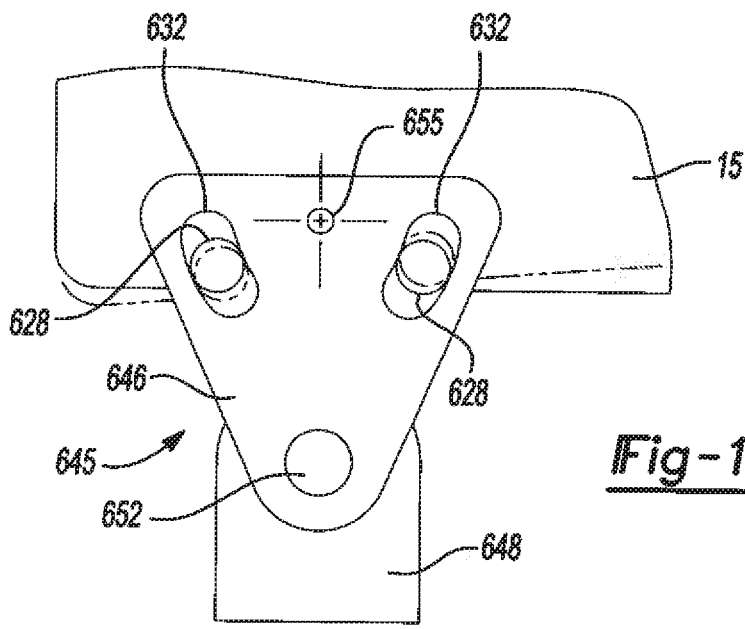
FIG. 16 is a front view of an alternative pivot bracket that can be incorporated into the vehicle seat assembly.

With reference to FIG. 16, another pivot bracket assembly 645 is provided that may be incorporated into the vehicle seat assembly 12 instead of the pivot bracket assembly 45 described above. The structure and function of the pivot bracket assembly 645 may be similar or identical to that of the pivot bracket assembly 45 apart from any differences described below. It will be appreciated that in configurations of the vehicle seat assembly 12 that include the pivot bracket assembly 645, the latch assembly 20 may or may not be adjustable (i.e., the latch plate 22 may or may not be adjustable relative to the bracket plate 24).

Like the pivot bracket assembly 45, the pivot bracket assembly 645 may include first and second bracket members 646, 648. The first and second bracket members 646, 648 may be pivotably attached to each other by a pivot pin 652. The second bracket member 648 may be fixedly attached to the vehicle floor 50. The first bracket member 646 may be pivotably attached to the side rail 15 of the seat bottom 14 by another pivot pin 655. The first bracket member 646 may include a pair of elongated slots 632 that movably receive shafts of fasteners 628 that engage the side rail 15. The elongated slots 632 may be curved such that the elongated slots 632 curve toward each other as they extend downward toward the second bracket member 648. In this manner, the first bracket member 646 can pivot and translate relative to the second bracket member 648 and the side rail 15 to adjust the position of the latch assembly 20 relative to the striker pin 60 to compensate for any misalignment between the striker pin 60 and the latch assembly 20.

Figure 17:
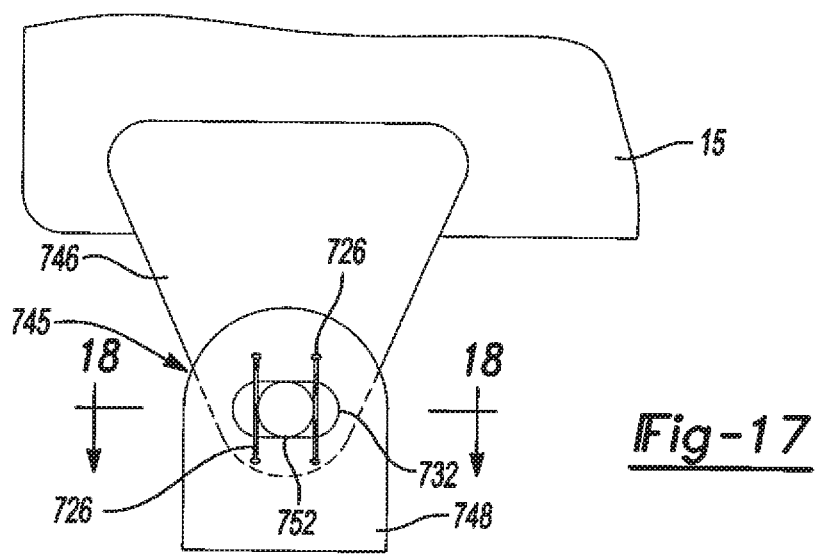
FIG. 17 is a front view of an alternative pivot bracket.
Figure 18:
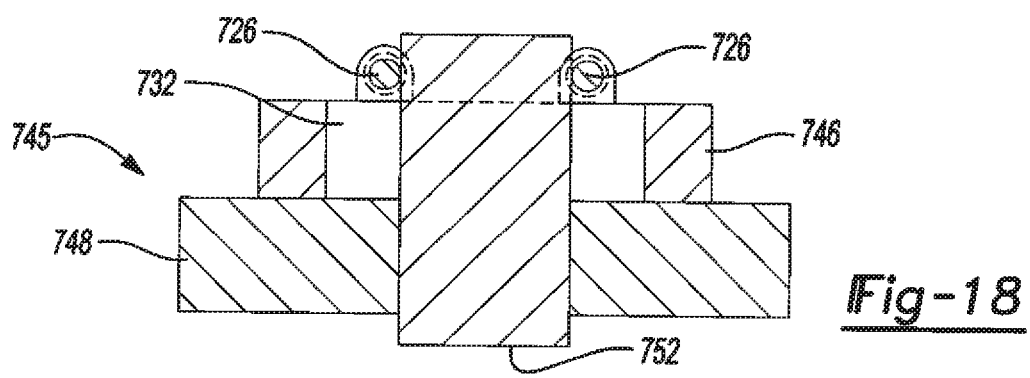
FIG. 18 is a cross-sectional view of the pivot bracket taken along line 18-18 of FIG. 17.

With reference to FIGS. 17 and 18, another pivot bracket assembly 745 is provided that may be incorporated into the vehicle seat assembly 12 instead of the pivot bracket assembly 645 described above. The structure and function of the pivot bracket assembly 745 may be similar or identical to that of the pivot bracket assembly 645 apart from any differences described below. It will be appreciated that in configurations of the vehicle seat assembly 12 that include the pivot bracket assembly 745, the latch assembly 20 may or may not be adjustable.

Like the pivot bracket assembly 45, 645, the pivot bracket assembly 745 may include first and second bracket members 746, 748. The first bracket member 746 may be mounted to the side rail 15 of the seat bottom 14. The first bracket member 746 may include an elongated slot 732 that movably receives a pivot pin 752. The elongated slot 732 may be elongated having a longitudinal axis perpendicular to the pivot pin 752. In this manner, the first bracket member 746 can pivot and translate relative to the second bracket member 748 to adjust the position of the latch assembly 20 relative to the striker pin 60 to compensate for any misalignment between the striker pin 60 and the latch assembly 20. As shown in FIG. 18, the pivot pin 752 may extend between adjacent spring members 726. In this way, the spring members 26 are disposed on both sides of the pivot pin 752 so the spring members 726 may bias the pivot pin 752 toward a nominal position.

With reference to FIG. 19, another pivot bracket assembly 845 is provided that may be incorporated into the vehicle seat assembly 12 instead of the pivot bracket assembly 45 described above. The structure and function of the pivot bracket assembly 845 may be similar or identical to that of the pivot bracket assembly 45, 645, 745, apart from any differences described below. It will be appreciated that in configurations of the vehicle seat assembly 12 that include the pivot bracket assembly 845, the latch assembly 20 may or may not be adjustable.

Like the pivot bracket assembly 45, the pivot bracket assembly 845 may include first and second bracket members 846, 848. As shown in FIG. 19, the first bracket member 846 may be attached to the side rail 15 of the seat bottom 14 by a pair of fasteners 828. The first bracket member 846 may include a pair of mounting apertures 832a that receive the pair of fasteners 828 that engage the side rail 15. The first bracket member 846 may include at least one elongated slot 832b that movably receive a pivot pin 852. The elongated slot 832 may be elongated having a longitudinal axis that is perpendicular to the pivot pin 852. In this manner, the first bracket member 846 can pivot and translate relative to the second bracket member 848 to adjust the position of the latch assembly 20 relative to the striker pin 60 to compensate for any misalignment between the striker pin 60 and the latch assembly 20. Furthermore, the shaft of the pivot pin 852 may extend between adjacent spring members 826. The spring members 826 are attached to the first bracket member 846 and extend beyond the ends of the elongated slot 832b so the spring members 826 may bias the pivot pin 852 toward a nominal position.

With reference to FIG. 20, another pivot bracket assembly 945 is provided that may be incorporated into the vehicle seat assembly 12 instead of the pivot bracket assembly 45 described above. The structure and function of the pivot bracket assembly 945 may be similar or identical to that of the pivot bracket assembly 45, 645, 745, 845, apart from any differences described below. It will be appreciated that in configurations of the vehicle seat assembly 12 that include the pivot bracket assembly 945, the latch assembly 20 may or may not be adjustable.

Like the pivot bracket assembly 45, the pivot bracket assembly 945 may include first and second bracket members 946, 948. The first bracket member 946 may be mounted to the side rail 15 of the seat bottom 14. The first bracket member 946 may include at least one elongated slot 932 that movably receive a shaft of pivot pin 952. The elongated slot 932 may be elongated having a longitudinal axis that is perpendicular to the pivot pin 952. In this manner, the first bracket member 946 can pivot and translate relative to the second bracket member 948 to adjust the position of the latch assembly 20 relative to the striker pin 60 to compensate for any misalignment between the striker pin 60 and the latch assembly 20. As shown in FIG. 20, at least one spring member 926 is fixedly attached to the first bracket member 946. The spring member 926 may include a circular hoop portion positioned in the center of the elongated slot 932 to receive the pivot pin 952 and bias the pivot pin 952 toward a nominal position. In this way, the spring member 926 may translate with the pivot pin 952 along the length of the elongated slot 932 relative to the second bracket member 948.

In any of the configurations described above, the side rail 15 could be movable relative to the seat bottom 14 or the side rail 15 may able to telescope relative to the seat bottom 14 to adjust the position of the latch assembly relative to the striker pin.

While the striker pin 60 is described above as being mounted to the vehicle floor 50, in some configurations, the striker pin 60 could be mounted to the seat bottom 14, and the latch assembly 20 could be mounted to the vehicle floor 50.

It will be appreciated that any of the self-adjusting latch assemblies described above could be mounted on the seatback 13 to attach the seatback 13 to a striker pin.

Referring now to FIG. 21, another latch assembly 1020 is provided that can be incorporated into the vehicle seat assembly 12 instead of the latch assembly 20. The structure and function of the latch assembly 1020 may be similar or identical to that of the latch assembly 20, apart from any exceptions described below.

The latch assembly 1020 may include a pair of latch plates 1022, a bracket plate 1024, a locking tab 1030 and a plurality of fasteners (e.g., shoulder bolts) 1028. The latch plates 1022 may have similar or identical structure as the latch plate 22 described above. The locking tab 1030 may be disposed between the latch plates 1022.

The latch plates 1022 may be movable attached to the bracket plate 1024 by the fasteners 1028 in the manner described above. That is, each fastener 1028 may extend through an aperture 1036a (e.g., like aperture 36a) in the latch plates 1022 and through an elongated slot 1032a (e.g., like slot 32a) in the bracket plate 1024. The fasteners 1028 and latch plates 1022 can move along the longitudinal axis of the slots 1032a to adjust the latch plates 1022 and locking tab 1030 relative to the striker pin 60.

A head 1029 of each fastener 1028 may abut one of the latch plates 1022. A nut 1031 may be threaded and/or welded onto a distal end of each fastener 1028. A nut plate 1033 may be disposed between the nut 1031 and the bracket plate 1024. Interference between the nut plate 1033 and a shoulder 1035 on a shaft 1037 of each fastener 1028 will prevent the nut plate 1033 from being clamped too tightly against the bracket plate 1024, thereby ensuring that the latch plates 1022, locking tab 1030 and fasteners 1028 can move freely relative to the bracket plate 1024. While not shown in FIG. 21, spring members may bias the fasteners 1028 toward a nominal position within the slots 1032a, as described above.

It will be appreciated that any of the adjustable latch assemblies 20, 320, 420, 520 described above may include structure similar or identical to the latch assembly 1020.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat assembly comprising:
   a seat bottom;
   a seatback attached to the seat bottom;
   a striker pin fixed to one of a vehicle floor or the seat bottom;
   a latch assembly mounted to the other of the vehicle floor and the seat bottom and including a latch plate having an opening and a movable locking tab configured to retain the striker pin within the opening; and
   a pivot bracket assembly including a first bracket member attached to the seat bottom and a second bracket member fixedly mounted to the vehicle floor, the first bracket member being pivotably attached to the second bracket member and including a plurality of curved elongated slots formed therein, wherein the curved elongated slots curve toward each other as they extend downward away from the seat bottom; and
   a plurality of pins each extending through a corresponding one of the curved elongated slots in the first bracket member and a corresponding one of a plurality of apertures in the seat bottom,
   wherein the first bracket of the pivot bracket assembly is movable relative to the vehicle floor and the seat bottom to align the opening in the latch plate relative to the striker pin.

2. The seat assembly of claim 1, wherein the latch plate is movable relative to the vehicle floor and the seat bottom, and wherein a plurality of springs resist movement of the latch plate and bias the latch plate toward a nominal position.

3. The seat assembly of claim 2, wherein the latch assembly further comprises a bracket plate having a plurality of elongated slots, and wherein the elongated slots define a range of motion of the latch plate relative to the vehicle floor.

4. The seat assembly of claim 3, wherein the latch plate opening includes two angled surfaces and a U-shaped portion, the angled surfaces extending outward and away from each other from the U-shaped portion.

5. The seat assembly of claim 4, wherein the latch assembly includes a plurality of fasteners each extending through a corresponding elongated slot in the bracket plate to a corresponding mounting aperture in the latch plate.

6. The seat assembly of claim 5, wherein the latch assembly includes a fastener extending through a pivot aperture in the latch plate and an aperture in the locking tab.

7. The seat assembly of claim 6, wherein the elongated slots in the bracket plate have longitudinal axes extending from a rear end of the seat bottom to a front end of the seat bottom.

8. The seat assembly of claim 6, wherein a plurality of spring members are mounted to the bracket plate to retain the fasteners and the latch plate at a nominal position once the latch plate receives the striker pin.

9. The seat assembly of claim 8, further comprising a nut and a nut plate engaging each of the fasteners, wherein a shoulder of each fastener interferes with the nut plate to limit travel of the nuts along the fasteners.

10. A seat assembly comprising:
    a seat bottom;
    a seatback attached to the seat bottom;
    a striker pin fixed to one of a vehicle floor or the seat bottom;
    a latch assembly mounted to the other of the vehicle floor or the seat bottom, the latch assembly including a latch plate having an opening and a movable locking tab configured to retain the striker pin within the opening, wherein the latch plate opening has two angled surfaces facing each other and extending to a U-shaped opening,
    a pivot bracket assembly including a first bracket member attached to the seat bottom and a second bracket member fixedly mounted to the vehicle floor, the first bracket member being pivotably attached to the second bracket member and including a plurality of curved elongated slots formed therein, wherein the curved elongated slots curve toward each other as they extend downward away from the seat bottom; and
    a plurality of pins each extending through a corresponding curved elongated slot in the first bracket member and a corresponding aperture in the seat bottom,
    wherein the plate first bracket member of the pivot bracket assembly is movable relative to the vehicle floor and the seat bottom to align the opening in the latch plate relative to the striker pin.

11. The seat assembly of claim 10, wherein the latch plate is movable relative to the vehicle floor and the seat bottom to align the opening in the latch plate relative to the striker pin, and wherein the latch assembly further comprises a bracket plate having a plurality of elongated slots that define a range of movement of the latch plate relative to the vehicle floor.

12. The seat assembly of claim 11, wherein the latch assembly includes a fastener extending through a corresponding one of the elongated slots in the bracket plate and an aperture in the latch plate.

13. The seat assembly of claim 12, wherein a plurality of spring members are mounted to the bracket plate to retain the fastener and the latch plate at a nominal position once the latch plate receives the striker pin.

* * * * *